（12） United States Patent
Zak et al.

(10) Patent No.: US 9,918,037 B2
(45) Date of Patent: Mar. 13, 2018

(54) MULTI-TIER COLOR LOOK-UP TABLE (LUT) DATABASE SYSTEM

(71) Applicant: THOMSON LICENSING, Issy de Moulineaux (FR)

(72) Inventors: Christian Ryan Zak, Los Angeles, CA (US); Arden A. Ash, Los Angeles, CA (US); James Desmond Ryan, Thousand Oaks, CA (US)

(73) Assignee: THOMSON Licensing, Issy-les-Moulineaux (FR)

( * ) Notice: Subject to any disclaimer, the term of this patent is extended or adjusted under 35 U.S.C. 154(b) by 454 days.

(21) Appl. No.: 14/612,097

(22) Filed: Feb. 2, 2015

(65) Prior Publication Data

US 2015/0220586 A1 Aug. 6, 2015

Related U.S. Application Data

(60) Provisional application No. 61/934,516, filed on Jan. 31, 2014.

(51) Int. Cl.
| | |
|---|---|
| *G11B 27/00* | (2006.01) |
| *H04N 5/93* | (2006.01) |
| *G06F 3/00* | (2006.01) |
| *H04N 5/76* | (2006.01) |

(52) U.S. Cl.
CPC ..................................... *H04N 5/76* (2013.01)

(58) Field of Classification Search
USPC .................................. 386/239–248, 278–290
See application file for complete search history.

(56) References Cited

U.S. PATENT DOCUMENTS

| | | | |
|---|---|---|---|
| 6,222,993 B1 | 4/2001 | Smart et al. | |
| 6,240,251 B1 | 5/2001 | Smart et al. | |
| 6,636,222 B1 * | 10/2003 | Valmiki | G06T 9/007 |
| | | | 345/505 |
| 7,268,897 B1 | 9/2007 | Moro et al. | |
| 8,204,304 B2 | 6/2012 | Suzuki | |
| 2007/0153100 A1 * | 7/2007 | Miura | G06T 11/001 |
| | | | 348/239 |
| 2009/0168082 A1 | 7/2009 | Aschenbrenner et al. | |
| 2010/0164979 A1 * | 7/2010 | Kawasaki | H04N 1/6052 |
| | | | 345/601 |
| 2011/0321132 A1 | 12/2011 | Slingerland et al. | |

* cited by examiner

*Primary Examiner* — Hung Dang
(74) *Attorney, Agent, or Firm* — Brian J. Dorini; Robert D. Shedd

(57) ABSTRACT

A multi-tier color look-up table (LUT) database system is provided. A first LUT can be stored in a database. First and second users can be granted access to the first LUT. The first and second users can have access to the first LUT for first and second periods of time, respectively. A second LUT can be stored in the database. The first user's access to the first LUT can be removed while the second user's access is maintained. The first and second users can be granted access to the second LUT. The first user can be granted a second access to the first LUT, and can have second access to the first LUT for a third period of time. The third period of time beginning after the end of the first period of time, with the second period of time overlapping with the first and third periods of time.

21 Claims, 15 Drawing Sheets

MULTI-TIER COLOR LOOK-UP TABLE (LUT) DATABASE SYSTEM

FIELD OF THE DISCLOSURE

This relates generally to database systems, and in particular, to database systems for storing and delivering color look-up tables (LUTs) created for the movie industry.

BACKGROUND OF THE DISCLOSURE

With the advent of digital image capture, many people believed that making movies would become less complicated because the variabilities associated with analog film, such as different types of film, different types of chemical development processes, etc., would not be an issue when working with digital image data. However, contrary to this belief, the rise of digital image capture introduced many other variabilities. For example, camera manufactures have many more options to tweak the image output of digital cameras because the camera itself can process the captured image. In an effort to obtain the best possible image from a particular sensor within a particular camera, a manufacturer typically will tweak various algorithms used within the camera to process the captured image data. As a result, the color characteristics of the images output by digital cameras can be dependent on the manufacturer and model of camera. Moreover, in contrast to film, the digital image output by a digital camera can be directly post-processed by digital image processing software. The additional variabilities introduced by digital image capture typically pose no problems to the average consumer. The average consumer owns a single camcorder, for example, and is not concerned that the color characteristics of images produced by his or her camcorder do not exactly match the images of other camcorders made by other manufacturers. In contrast, the variabilities in the color characteristics of images produced by different digital cameras can present several problems for the movie industry.

Movie productions can use several different types of movie cameras, and some large movie productions can use tens of different types of movie cameras. Shots from all or most of the different types of cameras are cut together to make the movie. Like consumer-grade digital cameras, each digital movie camera can produce images with color characteristics that are unique to the particular camera model and manufacturer. Some of the cameras used in movie productions may be expensive, high-end cameras that can capture a large range of detail, for example, a large color gamut. Other cameras used may be inexpensive cameras used to film shots in harsh or dangerous conditions in which a high-end camera is not suited. These inexpensive cameras might capture less detailed, lower-quality images.

Because of the variations in image characteristics of the cameras used to shoot a movie, the shots from each type of camera must be processed differently in order for the final cut of the movie to have a consistent look. The "look" of the movie refers to how the images of the movie appear when viewed, for example, on a screen or a display. For example, do the images appear bright or dark, focused or soft; are the colors saturated or washed-out; do the images have high contrast or a narrow range of contrast, etc.? The responsibility of matching the image characteristics of the shots of a movie to create a consistent look lies with a group of movie industry professionals called colorists.

For any given large-scale movie production, a movie studio may contract with one or more of a handful of companies that provide color services to the movie industry. In order to create a consistent look, a colorist can adjust and trim various image parameters, apply a variety of filters to image data, etc, for example. The process can be repeated for each type of camera used, for example, and the results can be further refined and matched. The process of creating a consistent look can be arduous. Once the colorist has modified the image data to achieve the desired look, image transformation data for each camera is typically captured in the form of a color LUT, which can be used to transform the color characteristics of image data of other shots to achieve the desired look. The color LUT corresponding to a particular camera can then be used to transform other shots from that camera. In this way, variations among the digital movie cameras used during the production of a movie can be minimized such that the shots captured by the cameras can be cut together into a movie with a consistent look. Color LUTs are also used to transform the color characteristics of image data to compensate for variations in the display systems used to view images, e.g., to adjust the look to be better suited to presentation in a movie theater, or displayed on a TV screen.

Colorists can deliver color LUTs to various entities external to the colorist's company, e.g., clients in the movie industry. For example, some clients can be associated with a movie studio, such as movie directors, camera operators, technical experts, etc. Other clients can include, for example, businesses that provide services to the movie studio, such as visual effects, digital mastering, home video mastering, marketing trailers, etc. During movie production, for example, the director needs to review shots in real-time on the set in order to make decisions whether to retake a shot. On the set, shots typically are reviewed on backlit display devices, such as LCD displays. The colorist creates on-set color LUTs for use with the display devices that are on the set, so that the image of the shot that appears on the display device is an accurate representation of how the shot will appear in a movie theater, for example. After filming is completed each day, the shots captured that day can be reviewed in a more controlled environment by, for example, the director and editor. These daily viewings can displayed on, for example, a projector and screen system. A set of color LUTs are created for daily viewings, also referred to as dailies. Likewise, color LUTs are created for other purposes: visual effects LUTs for use by visual effects artists, digital cinema master LUTs for displaying the movie in theaters with digital cinema systems, home-video master LUTs for tweaking the look of the movie in light of the constraints of DVD encoding, trailer LUTs for use by marketing to produce movie trailers, broadcast master LUTs for tweaking the movie for various broadcast standards, high-definition and ultra high-definition master LUTs, etc. In other words, during the course of movie production, post-production, marketing, and distribution, a large number of color LUTs can be created for different purposes and delivered to different entities in the movie industry.

Adding to the complexity, movie productions are often chaotic and unpredictable. Cameras, lighting, or other equipment may fail or not work properly, and variations in weather or other environmental factors may impact critical shots. Some shots simply cannot be shot again, for example, shots that are expensive to set up (perhaps involving pyrotechnics or dangerous stunts), shots that have captured a moment that cannot be reproduced (such as actor's improvisation), shots that have captured a natural phenomenon, etc. For some impacted shots, special color LUTs may be required to correct the look of the shot. In some cases, an exceptionally critical shot could drive a change to the look of the movie, requiring all previously-created color LUTs to be modified or redone entirely.

The complex logistics often required during movie production can also result in demands for new or modified LUTs. For example, a particular on-set display might become unavailable and be replaced with a different display, thus requiring a new color LUT to be created for the new display. The movie production may switch to on-location shooting, and the room used for viewing dailies may have different lighting conditions than expected, thus requiring a new color LUT. A contract with a particular visual effects house may fall through, and a replacement visual effects house may require a different format for the image data, requiring tweaking the visual effects LUTs for the new format.

Finally, the artistic and creative nature of movie making often contributes to demands for new or modified color LUTs. For example, directors and other creative decision-makers often wish to tweak the look of the movie as more and more shots are captured and reviewed. Creative decision-makers may wish to explore various possibilities for the look of the movie. Colorists can receive requests to create multiple alternative looks, and corresponding multiple sets of color LUTs, for review and comparison. For each decision to tweak the look of the movie, the changes may need to be propagated to all color LUTs used throughout the movie production, requiring creation of a large number of new or modified color LUTs.

SUMMARY OF THE DISCLOSURE

A multi-tier color LUT database system can be used for management and distribution of color LUTs. A first LUT can be stored in a database. The first LUT can be, for example, a color LUT created for an initially-desired look of a movie. A first user can be granted access to the first LUT. For example, a movie director may be granted access to the first LUT and may download and use the first LUT during movie production. A second user can be granted access to the first LUT. The second user can have access to the first LUT for a second period of time. For example, a colorist employed by the color service provider can be granted access to the first LUT, the access continuing even if the director's access to the first LUT is removed. The colorist's access to the first LUT may end, for example, at the completion of movie production. A second LUT can be stored in the database. For example, a new color LUT may be created for a new look desired for the movie, and the second LUT can be stored in the database. The first user's access to the first LUT can be removed while the second user's access to the first LUT is maintained. In this case, the first user has access to the first LUT for a first period of time that begins when access to the first LUT was granted and ends when access to the first LUT was removed. The first user can be granted access to the second LUT, and the second user can be granted access to the second LUT. The first user can be granted a second access to the first LUT. For example, the director may wish to revert to the first LUT, and a second access may be granted to the director. The first user can have access to the first LUT for a third period of time, the third period of time beginning after the end of the first period of time. For example, the director's second access to the first LUT can begin when the second access is granted and can end, for example, at the completion of movie production. The second period of time can overlap with the first and third periods of time. For example, the period of time the colorist has access to the first LUT can begin while the director has access to the first LUT and can end after the director has been granted second access to the first LUT. For example, the director can be granted access to first-tier LUTs, e.g., the color LUTs that are currently-used and/or most relevant to the movie production, and the colorist can be granted access to the first-tier LUTs and second-tier LUTs, which have become apparently obsolete. In this way, the apparently obsolete first LUT can be more efficiently recovered and delivered to the director without burdening the director with access to numerous apparently obsolete color LUTs.

DETAILED DESCRIPTION

Figure 1:
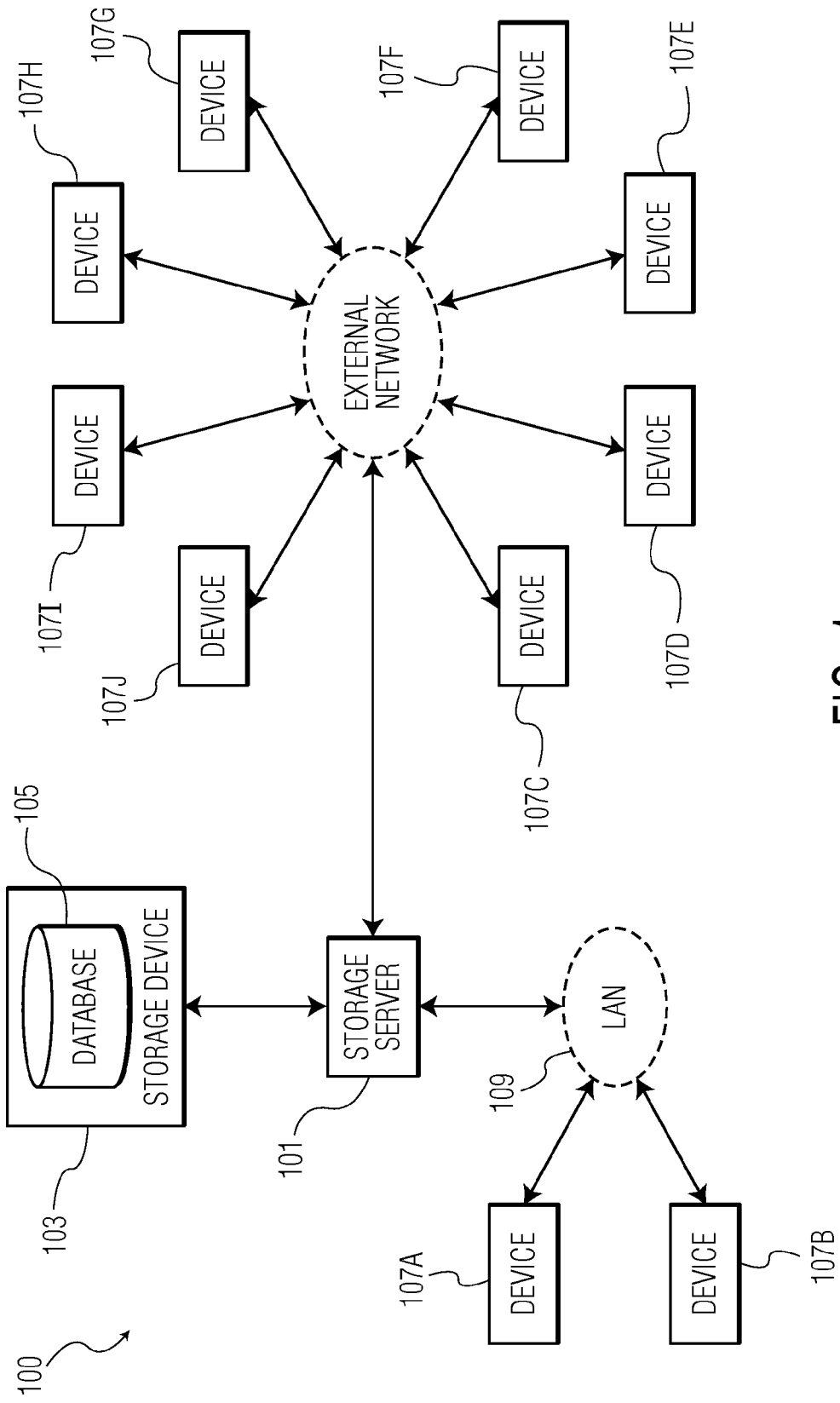
FIG. 1 illustrates an example computer network according to various embodiments.

Management and delivery of color LUTs in the movie industry can create unique challenges that are not faced in other industries. As noted above in the BACKGROUND OF THE DISCLOSURE, numerous color LUTs can be created and delivered to various external entities, e.g., clients in the movie industry, throughout movie production, post-production, distribution, and marketing. In particular, due to the unpredictability, complex logistics, and artistic and creative nature of movie production and distribution, the color LUTs may need to be modified or completely changed many times over the course of production and distribution, which can often span several months or years. In other words, over the course of several months or years, many color LUTs that were created and delivered to clients may become unused, or old, as new or modified color LUTs are created to meet the clients' current demands.

Access to the many old color LUTs may be overwhelming to a client and may create a risk that the client mistakenly uses an old color LUT. Therefore, it can be beneficial to remove a client's access to old color LUTs, so that the client has access to only the LUT or LUTs that are currently being used for, or are the most relevant to, the movie production, e.g., the final LUTs used for the movie.

On the other hand, it occasionally happens in the movie industry that an old color LUT, or a modified version of an old color LUT, can be desired again at a later time. Colorists occasionally receive requests for an old color LUT that is no longer being used in the movie production. Colorists also occasionally receive requests to create a color LUT that is similar to an old color LUT, but with some modifications, e.g., tweaks. For example, although a director may decide to change the look of the movie at some time during production, thus making the previously-created color LUTs obsolete in view of new color LUTs for the new look, the director may later wish to revert back to the previous look, or a look similar to the previous look. Due to this situation, color LUTs that were created for the movie industry and that later became unused can be more accurately described as apparently obsolete color LUTs because some color LUTs that were once thought to be obsolete can suddenly be desired again.

The occasional desire of clients to use apparently obsolete color LUTs and the desire of clients not to be burdened with tracking numerous apparently obsolete color LUTs can create two competing design goals for systems that distribute color LUTs to the movie industry. In order to manage these two competing design goals, it can be beneficial for an internal entity, such as a colorist employed by the color service provider, to maintain access to apparently obsolete color LUTs even though the client's access is removed. In this way, for example, an archive may be maintained in case the client desires to reuse an apparently obsolete color LUT, while at the same time, the client may be relieved of the burden of access to many apparently obsolete color LUTs.

FIG. 1 illustrates an example computer network 100 according to various embodiments. Computer network 100 can include a storage server 101, a storage device 103 storing a database 105, devices 107A-107J, a local area network (LAN) 109, and an external network 111. Storage device 103 can be, for example, a hard disk drive (HDD), a solid state drive (SSD), etc., that stores database 105. Storage server 101 can be, for example, a computer server connected to storage device 103. Storage server 101 can include hardware, such as one or more processors and memory, software, and/or firmware to perform various functions, including managing access to database 105 according to the methods described in more detail below. Devices 107A-107J can be, for example, desktop computers, laptop computers, tablet computers, mobile devices, etc.

In this example, storage server 101, storage device 103 and database 105, LAN 109, and devices 107A-107B can be operated by a color service provider that creates and delivers color LUTs to various external entities, e.g., clients in the movie industry. Devices 107C-107J can be operated by the various external entities, for example, clients at a movie studio, such as movie directors, camera operators, technical experts, etc., or clients at businesses that provide services to the movie studio, such as visual effects, digital mastering, home video mastering, movie trailers, etc. Devices 107C-107J can connect to storage server 101 through external network 111. External network 111 can be, for example, the Internet.

Devices 107A and 107B can connect to storage server 101 through LAN 109. Device 107A can be operated by, for example, a colorist responsible for creating the color LUTs. The color LUTs can be stored in database 105. Device 107B can be operated by a color LUT database administrator responsible for maintaining database 105. The database administrator can, for example, upload color LUTs that have been created by the colorist, set permissions to access the database, create and modify user accounts, etc. The database administrator may create user accounts and set permissions for the various external entities, for example. The database administrator may also create user accounts and set permissions for various internal entities, e.g., employees of the color service provider, such as the colorist that created color LUTs stored in database 105. In this way, the color LUTs in database 105 may be accessed by internal entities, such as the colorist.

Devices 107C-107J, operated by clients in the movie industry, can connect to storage server 101 through external network 111 to access color LUTs stored in database 105. As explained in more detail below, specific permissions for access can be granted to various internal and external entities as part of a multi-tier color LUT database system.

Figure 2:
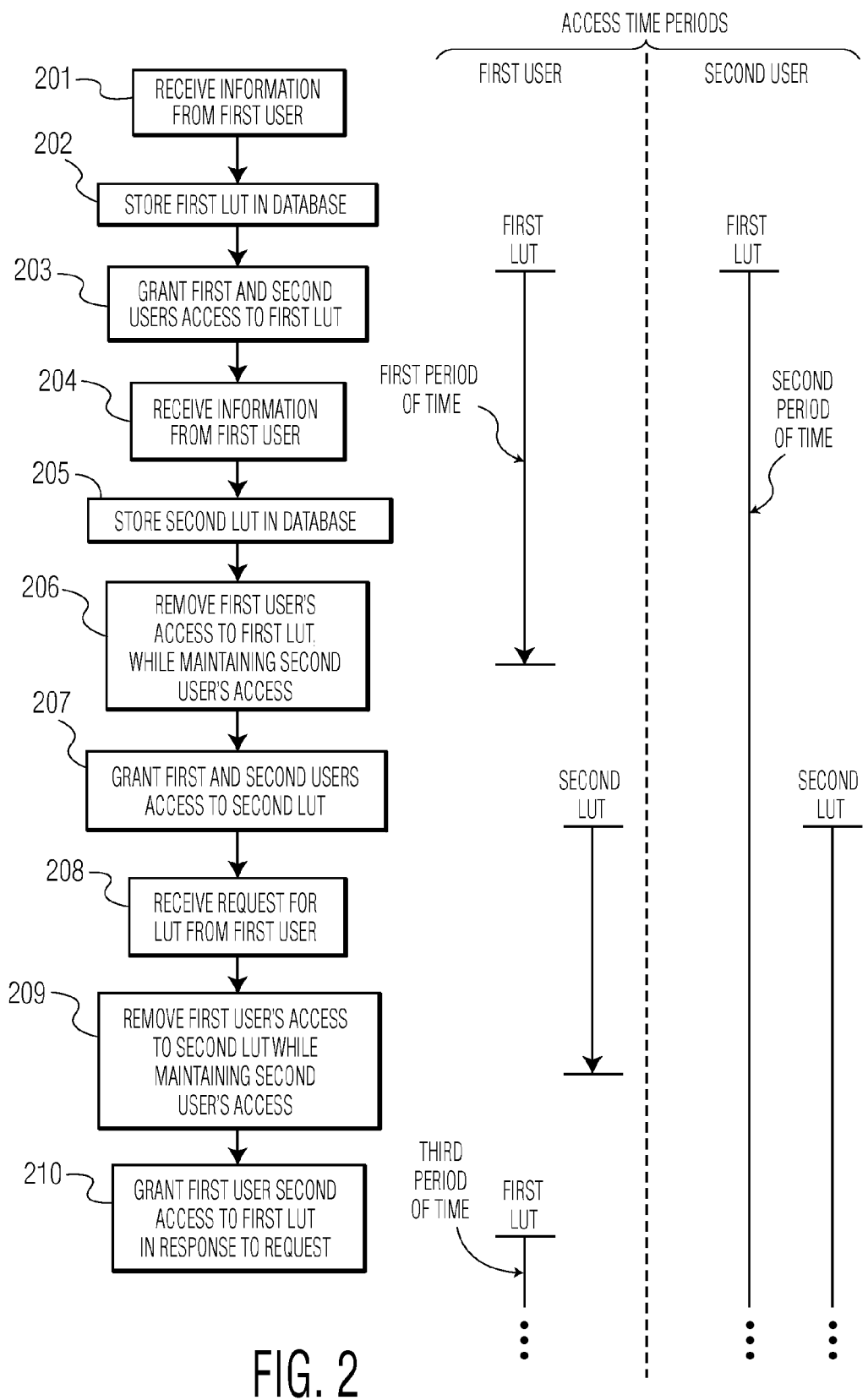
FIG. 2 illustrates an example flowchart and corresponding timeline according to various embodiments.

FIG. 2 illustrates an example flowchart and corresponding timeline according to various embodiments. Referring to the example flowchart in FIG. 2, information can be received (201) from a first user, and a first LUT can be stored (202) in a database. In one illustrative scenario, the first user can be a movie director, and the information can include image data or film of a shot taken during movie production, along with a request for creation of a color LUT to give the movie a particular look that the director desires. The director may, for example, want the movie to have a look that is similar to the look of another movie. In this case, the information may include a reference to the other movie. On the other hand, the director may want the movie to have a unique look that is unlike other movies. In this case, the information may include more specific descriptions of how the director would like the movie to look. For example, the information may include the director's instructions to make the lighting in the shot appear stark with muted colors. In some cases, the information may include a reference to a previously-created color LUT of which the director is aware, perhaps with the additional instructions, for example, to create new LUT that is similar to the previous LUT, but with some minor changes. Based on the information received from the first user, the first LUT can be created and stored in a database, such as database 105 shown in FIG. 1.

Once the first LUT is stored in the database, the first user and a second user can be granted access (203) to the first LUT. The second user can be, for example, a colorist that created the first LUT to fulfill the director's request. In this illustrative scenario, for example, the colorist may have received the request for the color LUT from the director, and after creation of the first LUT, the colorist may have sent the first LUT to the color LUT database administrator with instructions to store the first LUT in the database and to grant the director access. Referring to computer network 100 of FIG. 1 as an example, the database administrator can use device 107A to connect to storage server 101 through LAN 109, store the first LUT in database 105, and set the permissions through software executed on the storage server to allow the director and the colorist access to the first LUT.

Once the director is granted access, the director can access the first LUT in the database, for example, to download the first LUT for use in the movie production. For example, in the computer network 100 shown in FIG. 1, the director may use a device such as device 107C to login to storage server 101 through external network 111 using a predetermined user name and password set by the database administrator, and storage server 101 can allow the director access to the first LUT. The director can download the first LUT to device 107C and use the first LUT during the movie production.

Referring again to the example flowchart shown in FIG. 2, additional information can be received (204) from the first user. For example, the director may decide to change look of the movie and request a new color LUT from the colorist. A second LUT can be stored (205) in the database. For example, the colorist can create a new color LUT, i.e., second LUT, which can be stored in the database by the database administrator. The first user's access to the first LUT can be removed (206) while the second user's access to the first LUT is maintained. For example, if the director approves of the second LUT, the database administrator can remove the director's access to the first LUT and not remove the colorist's access to the first LUT. In other words, the director can make a value determination of the first LUT and a value determination of the second LUT, and based on a comparison of the value determinations, decide to use the second LUT instead of the first LUT. The first and second users can be granted (207) access to the second LUT. For example, the database administrator can grant the director and the colorist access to the second LUT.

In the illustrative scenario, the change in the desired look of the movie can cause creation of the second LUT, and the first LUT can become apparently obsolete. Due to the issues of color LUT management in the movie industry as described above, in which numerous color LUTs can be created and delivered throughout the production, post-production, marketing, and distribution of the movie, the director's access to apparently obsolete color LUTs, such as the first LUT, can be removed so that the director does not become overwhelmed by numerous color LUTs in the database and, for example, mistakenly download and use an obsolete first LUT. In this way, it can be advantageous to limit the first user's access to include only the LUT or LUTs that are currently the most relevant to the movie production, e.g., the final LUTs used for the movie. The LUT or LUTs that are currently the most relevant can be referred to as first-tier LUTs. In other words, the first user's access can be limited to include only first-tier LUTs in the database.

On the other hand, it occasionally happens in the movie industry that an apparently obsolete color LUT can be desired at a later time. In this case, a request for another color LUT may be received (208) from the first user, and the request can include a reference to an earlier color LUT that was previously created. The first user's access to the second LUT can be removed (209) while the second user's access to the second LUT can be maintained, and the first user can be granted (210) access to the first LUT again, i.e., the first user can be granted a second access to the first LUT, in response to the request. For example, after shooting of the movie is completed, the final cut of the movie has been made, and home video mastering has begun, the director may realize that the home video version of the movie might be better presented using one of the color LUTs that was created earlier during production of the movie, e.g. the first LUT, and that had become apparently obsolete because a different color LUT, e.g., the second LUT, was selected. In this case, the director may contact the colorist and request the earlier color LUT. Often the first user may not be able to recall the exact identity of the earlier color LUT that is now desired. However, because the colorist's access to the first LUT was maintained, the colorist more easily retrieve the first LUT for the director.

Some color LUTs that were determined to be apparently obsolete, such as the first LUT, can be referred to as second-tier LUTs. Maintaining the second user's access to second-tier LUTs can help maintain a readily accessible archive of color LUTs that were created and delivered to an external entity, such as the first user. In this way, for example, the second user's continued access to the first LUT can provide an underlying continuity between the time periods the first user has access to the first LUT, as illustrated in the access time periods diagram in FIG. 2.

FIG. 2 illustrates the access time periods of the first and second users. The first user has access to the first LUT for a first period of time, which begins when the first user is granted (203) access to the first LUT and ends when the first user's access to the first LUT is removed (206). The second user has access to the first LUT for a second period of time, which begins when the second user is granted (203) access to the first LUT and ends at an unspecified time. For example, the database administrator may remove the second user's access to the first LUT when the movie production ends, or the second user's access may continue indefinitely. The first user has a second access to the first LUT for a third period of time, which begins when the first user is granted (209) the second access to the first LUT and ends at an unspecified time. For example, the database manager may remove the first user's second access to the first LUT when the movie production ends, when the first user requests another color LUT to replace the first LUT, etc.

As shown in FIG. 2, the second period of time (during which the second user has access to the first LUT) overlaps with the first and third periods of time (during which the first user has first access and second access, respectively, to the first LUT). In this way, for example, the second user's continued access to the first LUT can provide an underlying continuity between the time periods the first user has access to the first LUT.

Figure 3:
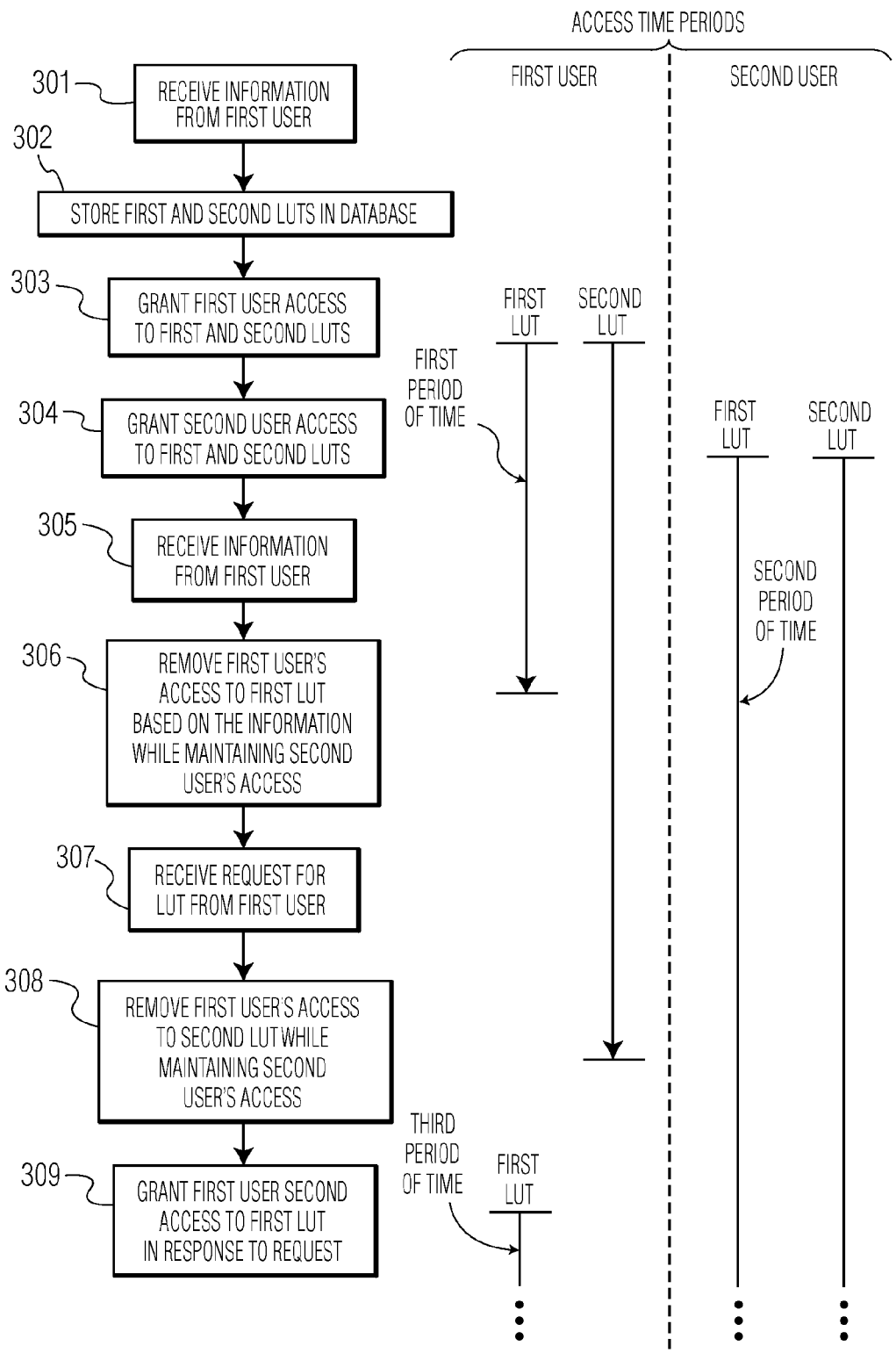
FIG. 3 illustrates another example flowchart and corresponding timeline according to various embodiments.

FIG. 3 illustrates another example flowchart and corresponding timeline according to various embodiments. Referring to the example flowchart in FIG. 3, information can be received (301) from a first user, and a first LUT and a second LUT can be stored (302) in a database. For example, the first user can be a movie director, and the information can include image data or film of a shot taken during movie production, along with a request for creation of two color LUTs that produce different looks of the movie, so that the director can compare the two looks and select which one is preferred. The information can also include a description of the two different looks desired for the two color LUTs. Based on the information received from the first user, the first and second LUTs can be created and stored in a database, such as database 105 shown in FIG. 1.

Once the first and second LUTs are stored in the database, the first user can be granted access (303) to the first and second LUTs. A second user can also be granted (304) access to the first and second LUTs. The second user can be, for example, a colorist that created the first and second LUTs to fulfill the director's request.

Additional information can be received (305) from the first user. For example, the director may select the second LUT for the movie and decide not to use the first LUT. In other words, the director can make a value determination of the first LUT and a value determination of the second LUT.

Based on a comparison of the two value determinations, the director may decide to select the second LUT instead of the first LUT. The first user's access to the first LUT can be removed (306) while the second user's access to the first LUT is maintained. For example, the database administrator can remove the director's access to the first LUT and not remove the colorist's access to the first LUT.

In the illustrative scenario, the selection of the second LUT over the first LUT can cause the first LUT to become apparently obsolete. As discussed above regarding the issues of color LUT management in the movie industry as described above, in which numerous color LUTs can be created and delivered throughout the production, post-production, marketing, and distribution of the movie, it can be advantageous to remove the director's access to the apparently obsolete first LUT. Also as discussed above, it can happen in the movie industry that an apparently obsolete color LUT can be desired at a later time. In this case, a request for another color LUT may be received (307) from the first user, and the request can include a reference to an earlier color LUT that was previously created, such as the first LUT. The first user's access to the second LUT can be removed (308) while the second user's access to the second LUT can be maintained, and the first user can be granted (309) access to the first LUT again, i.e., granted a second access, in response to the request. As in the example shown in FIG. 2 and described above, because the colorist's access to the first LUT was maintained, the colorist can more easily retrieve the first LUT for the director.

FIG. 3 illustrates the access time periods of the first and second users. The first user has access to the first LUT for a first period of time, which begins when the first user is granted (303) access to the first LUT and ends when the first user's access to the first LUT is removed (306). The second user has access to the first LUT for a second period of time, which begins when the second user is granted (304) access to the first LUT and ends at an unspecified time. For example, the database administrator may remove the second user's access to the first LUT when the movie production ends, or the second user's access may continue indefinitely. The first user has a second access to the first LUT for a third period of time, which begins when the first user is granted (309) the second access to the first LUT and ends at an unspecified time. For example, the database manager may remove the first user's second access to the first LUT when the movie production ends, when the first user requests another color LUT to replace the first LUT, etc.

As shown in FIG. 3, the second period of time (during which the second user has access to the first LUT) overlaps with the first and third periods of time (during which the first user has first access and second access, respectively, to the first LUT). In this way, similar to the example described above with reference to FIG. 2, the second user's continued access to the first LUT can provide an underlying continuity between the time periods the first user has access to the first LUT.

Figure 4:
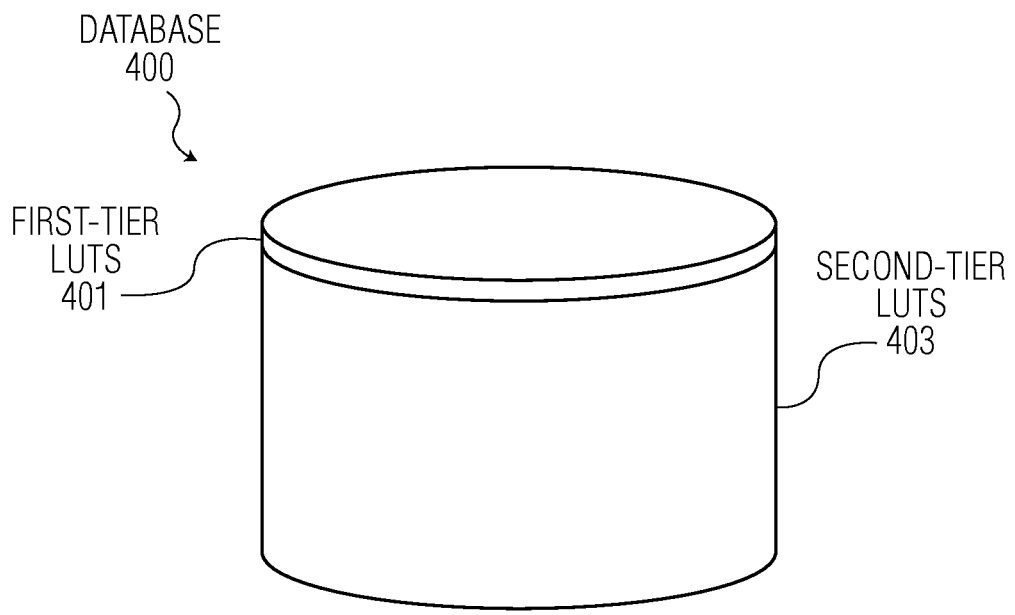
FIG. 4 illustrates an example database according to various embodiments.

FIG. 4 illustrates an example database 400 according to various embodiments. Database 400 can include first-tier LUTs 401 and second-tier LUTs 403. In this example, the LUTs in database 400 can be created for a single movie. However, in some embodiments, color LUTs for multiple movies can be stored in a database, and permissions can be set to restrict each entity's access to include only the color LUTs corresponding to the movie the entity is associated with. In some embodiments, each color LUT in database 400 can be assigned a tier designation, e.g., first-tier, second-tier, etc., for example, by marking an appropriate data field associated with the color LUT. As discussed above, numerous color LUTs can be created during movie production, post-production, marketing, and distribution. As illustrated in FIG. 4, the number of color LUTs in the second tier can be much greater than the amount of color LUTs in the first tier.

In some cases, it may not be beneficial to maintain the second user's access to all color LUTs that have become apparently obsolete. For example, a colorist might create a first LUT for use with a particular movie camera that the director anticipates using to shoot the movie. Subsequently, the director may inform the colorist that the anticipated camera cannot be obtained and may request a second LUT for use with different camera that has been obtained. In this case, there may be no benefit in maintaining the colorist's access to the first LUT because of the improbability that the first LUT will be requested in the future.

Figure 5:
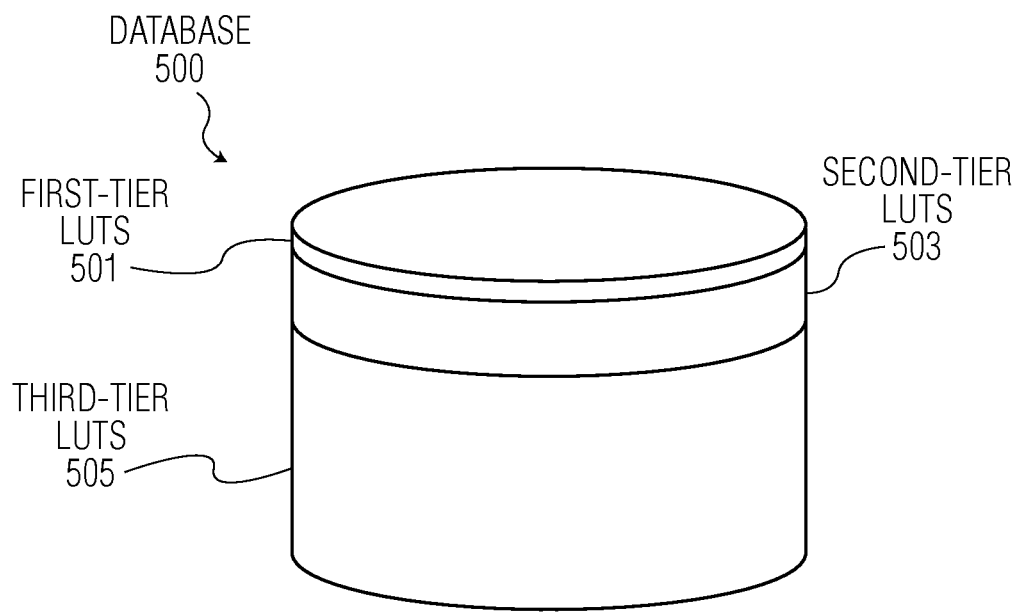
FIG. 5 illustrates another example database according to various embodiments.

In this regard, FIG. 5 illustrates an example database 500 according to various embodiments. Database 500 can include first-tier LUTs 501, second-tier LUTs 503, and third-tier LUTs 505. In this example, when a color LUT created for a movie becomes apparently obsolete, a first user's access to the color LUT can be removed, as described above with reference to the examples of FIGS. 2-4. In addition, a determination can be made whether to maintain a second user's access to the color LUT (i.e., make the color LUT a second-tier LUT 503) or to remove the second user's access to the color LUT (i.e., make the color LUT a third-tier LUT 505). In other words, neither the first user nor the second user has access to third-tier LUTs 505. Access to third-tier LUTs 505 can be retained by the database administrator, for example.

The determination of whether to make a color LUT a second-tier LUT or a third-tier LUT can depend on, for example, the information received from the first user. For example, a director might express strong disapproval of a particular color LUT soon after downloading it from the database. In this case, it might be clear that the color LUT should be assigned as a third-tier LUT in the database. In another situation, a director may request a new color LUT merely because a new movie camera is being tried out for the movie. In this case, the previous color LUT might be assigned as a second-tier LUT in anticipation that the director may return to the previous movie camera if the new movie camera does not work out.

Figure 6:
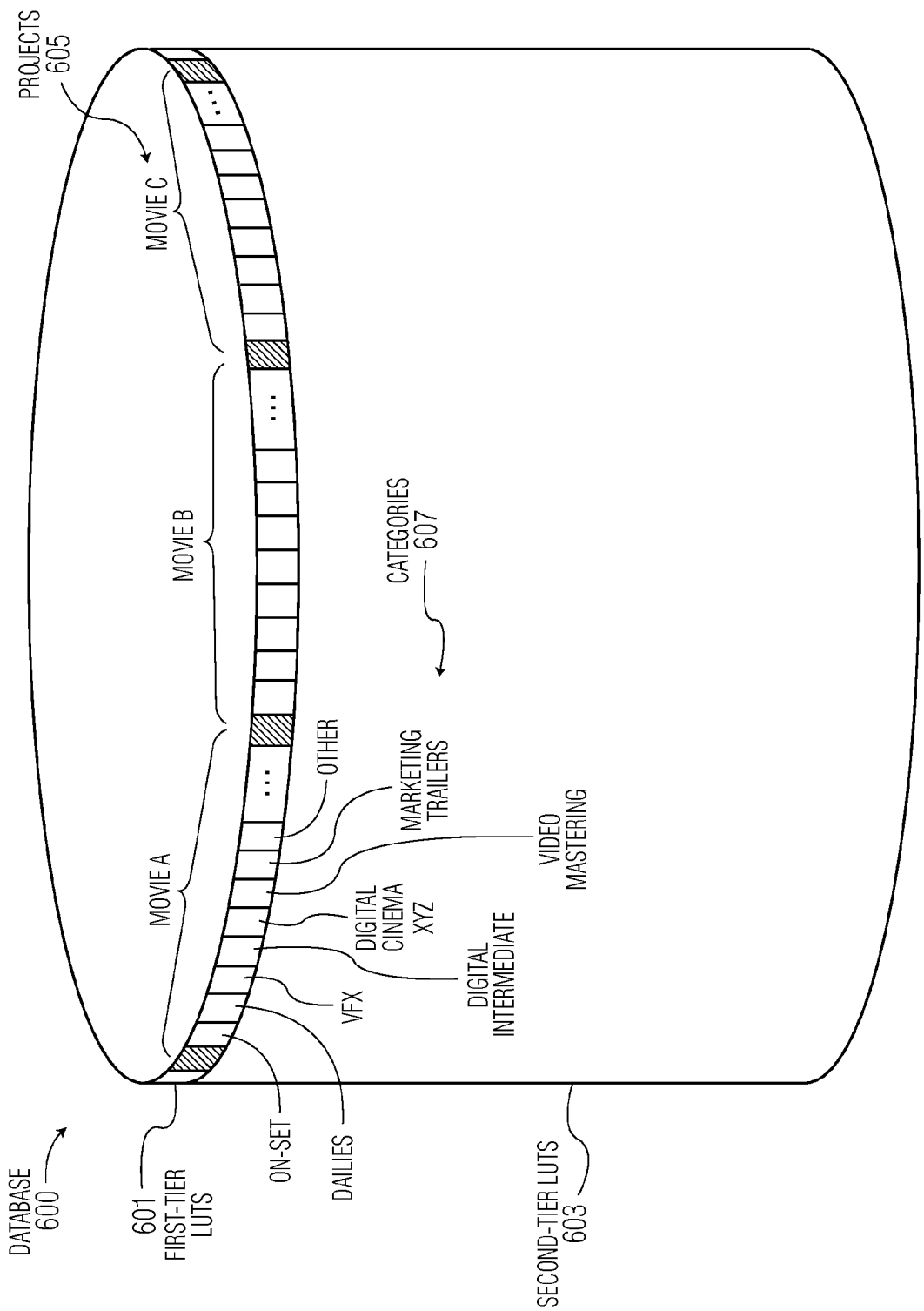
FIG. 6 illustrates yet another example database according to various embodiments.

FIG. 6 illustrates another example database according to various embodiments. FIG. 6 shows a database 600 that can include first-tier LUTs 601 and second-tier LUTs 603. Database 600 can include multiple projects 605. In this example, each project can correspond to a movie, such as Movie A, Movie B, Movie C, etc. Each project 605 can be divided into multiple categories 607. Each category 607 can correspond to a particular use of the color LUT and/or a particular internal or external entity that will use the color LUT. For example, an On-Set category can correspond to color LUTs that are to be used on-set. A Dailies category can correspond to color LUTs that are to be used for dailies. Other categories can correspond to color LUTs that are to be used for visual effects (VFX), digital intermediate (DI), digital cinema XYZ, video mastering, marketing trailers, etc. A catch-all category, shown in FIG. 6 as Other, can include color LUTs that do not fall into any other category. Although FIG. 6 illustrates projects 605 and categories 607 with respect to only first-tier LUTs 601, it should be understood that second-tier LUTs 603 can also be divided into projects 605 and categories 607. It should also be understood that projects 605 and categories 607 can also be applied to other tiers of color LUTs in other embodiments, such as third-tier LUTs 505 shown in FIG. 5.

Associating color LUTs in database 600 to particular projects 605 and categories 607 can simplify the management of permissions, e.g., granting and removing access to particular color LUTs. For example, as will be explained in more detail below with respect to FIGS. 11 and 13, the permissions of a first user can be set such that the first user can access the color LUTs associated with a particular category 607 within a particular project 605. For example, the director of Movie A might be given access to the first-tier LUTs associated with the On-Set and Dailies categories 607 within the Movie A project 605. A visual effects shop that is working on Movie B and Movie C can be granted access to the first-tier LUTs in the VFX category 607 within the Movie B and Movie C projects 605. A colorist working on Movie A might be granted access to the first-tier LUTs and the second-tier LUTs associated with all of the categories 607 for the Movie A project 605. In this way, for example, once the specific permissions are set for a particular user, a change in a project, category, or tier designation of a color LUT may be all that is needed to grant or remove access of that color LUT by a particular user.

FIGS. 7-16 illustrate example graphical user interfaces (GUIs) that can implement an example multi-tier color LUT database system according to various embodiments. The example GUIs can be generated by software executed by storage server 101 described in FIG. 1, for example.

Figure 7:
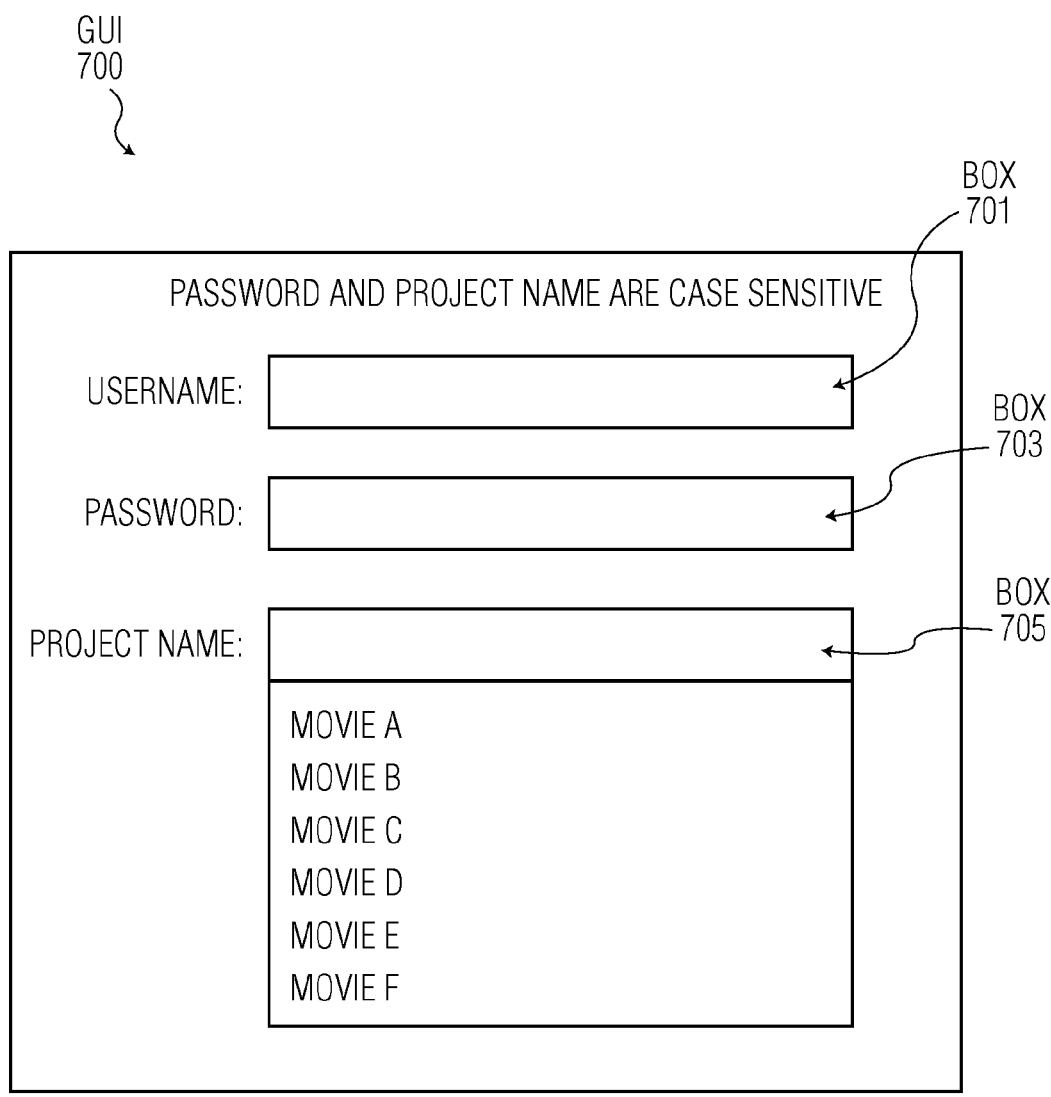
FIG. 7 illustrates an example login graphical user interface (GUI) according to various embodiments.
Figure 8:
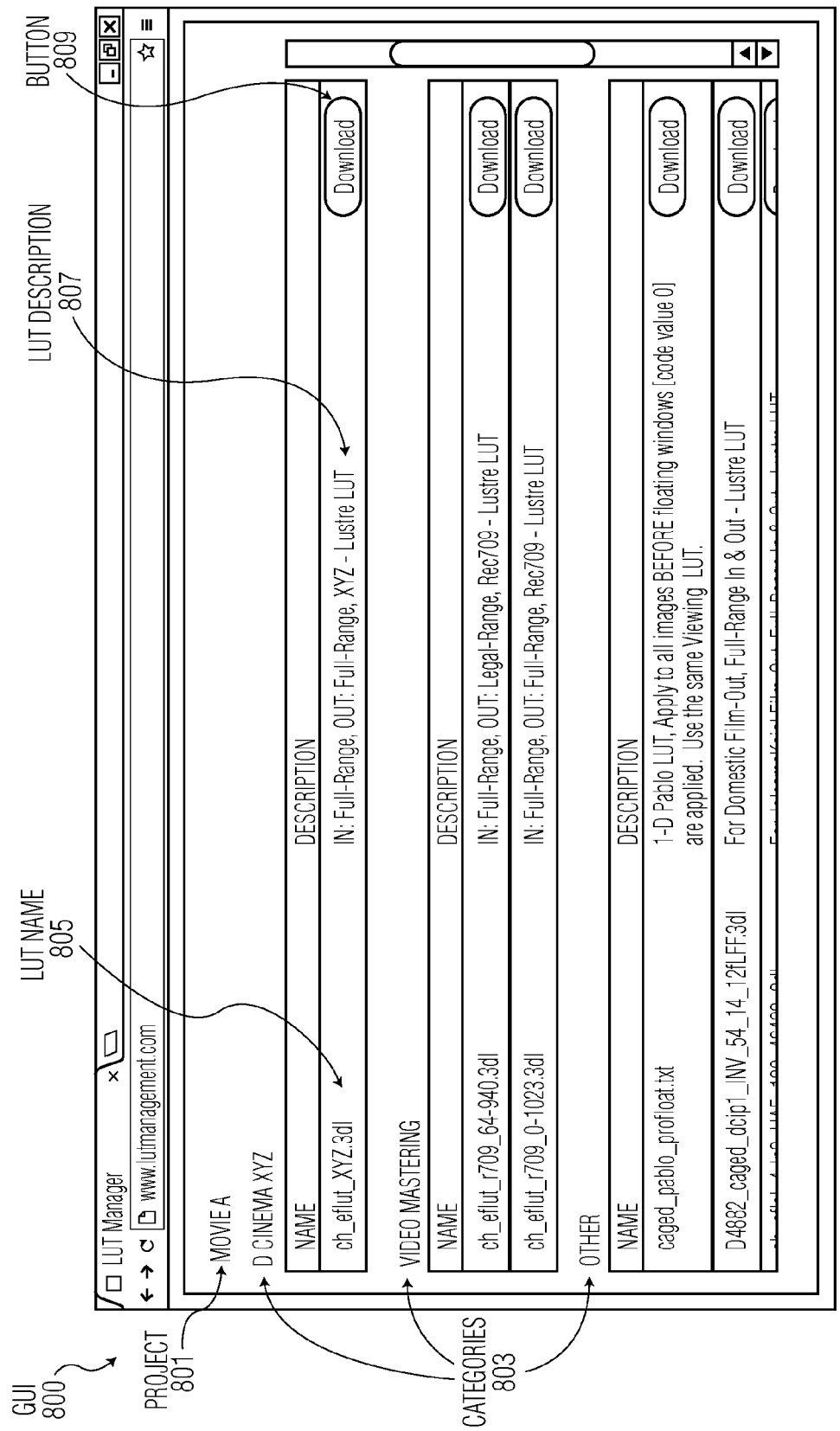
FIG. 8 illustrates an example GUI for a first user according to various embodiments.

FIG. 7 illustrates an example login GUI 700 according to various embodiments. A user can input a pre-assigned username in text box 701 and input a password in text box 703. The user may also input a project name in text box 705 by selecting a project name from a drop-down menu. FIG. 8 illustrates an example GUI 800 for a first user, such as the first user described above with reference to FIGS. 2 and 3, which the first user can access after a successful login. As described above with respect to FIG. 6, the permissions of the first user may be set such that the first user has access to a limited set of one or more of multiple categories of color LUTs. In this example, the first user's permissions have been set such that the first user has access to the first-tier LUTs in the categories of Digital Cinema XYZ, Video Mastering, and Other in the Movie A project. GUI 800 can also include a color LUT name 805, a color LUT description 807, and a button 809 for each color LUT to which the first user has access. To download a color LUT, the first user can activate (e.g., click on) the corresponding button 809.

Figure 9:
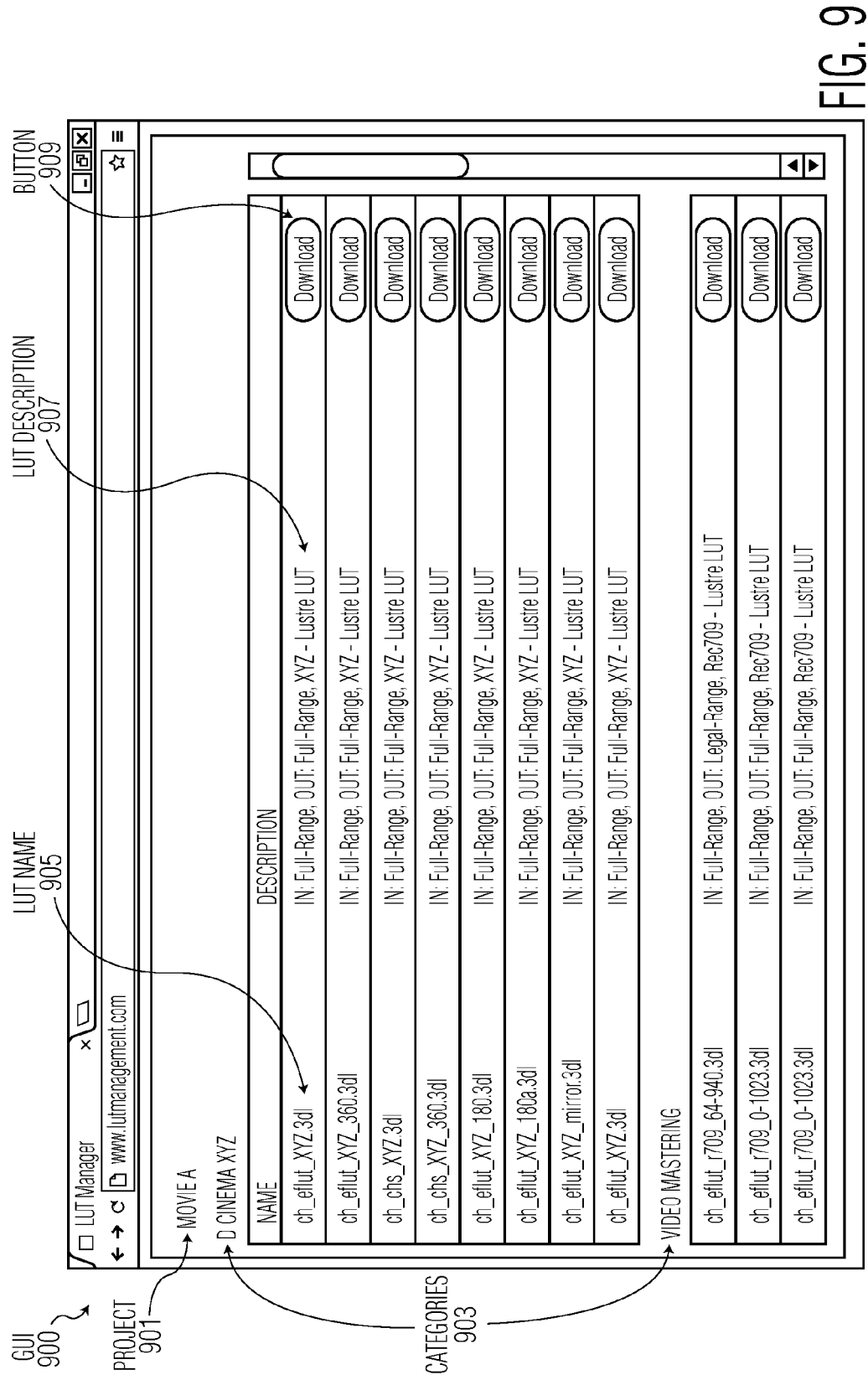
FIG. 9 illustrates an example GUI for a second user according to various embodiments.

FIG. 9 illustrates an example GUI 900 for a second user, such as the second user described above with respect to FIGS. 2 and 3, which the second user can access after a successful login through GUI 700. In this example, the second user's permissions have been set such that the second user has access to the first-tier LUTs and the second-tier LUTs in the categories of Digital Cinema XYZ, Video Mastering, and Other in the Movie A project. For each color LUT to which the second user has access, GUI 900 can include a color LUT name 905, a color LUT description 907, and a button 909 to download the corresponding color LUT. In this example, GUI 800 and GUI 900 can be the same GUI, with GUI 900 showing more color LUTs than GUI 800 because the second user has access to more color LUTs than the first user. However, it should be understood that GUI 800 and GUI 900 can be different GUIs that can provide different functionalities.

FIGS. 10-17 illustrate an example GUI for users with administrative privileges, such as the database administrator described above with reference to FIGS. 2 and 3. Some embodiments can include more than one level of administrative privileges. For example, the highest level of administrative privileges can be granted to "super administrators," and a lower level of administrative privileges can be granted to "administrators."

Figure 10:
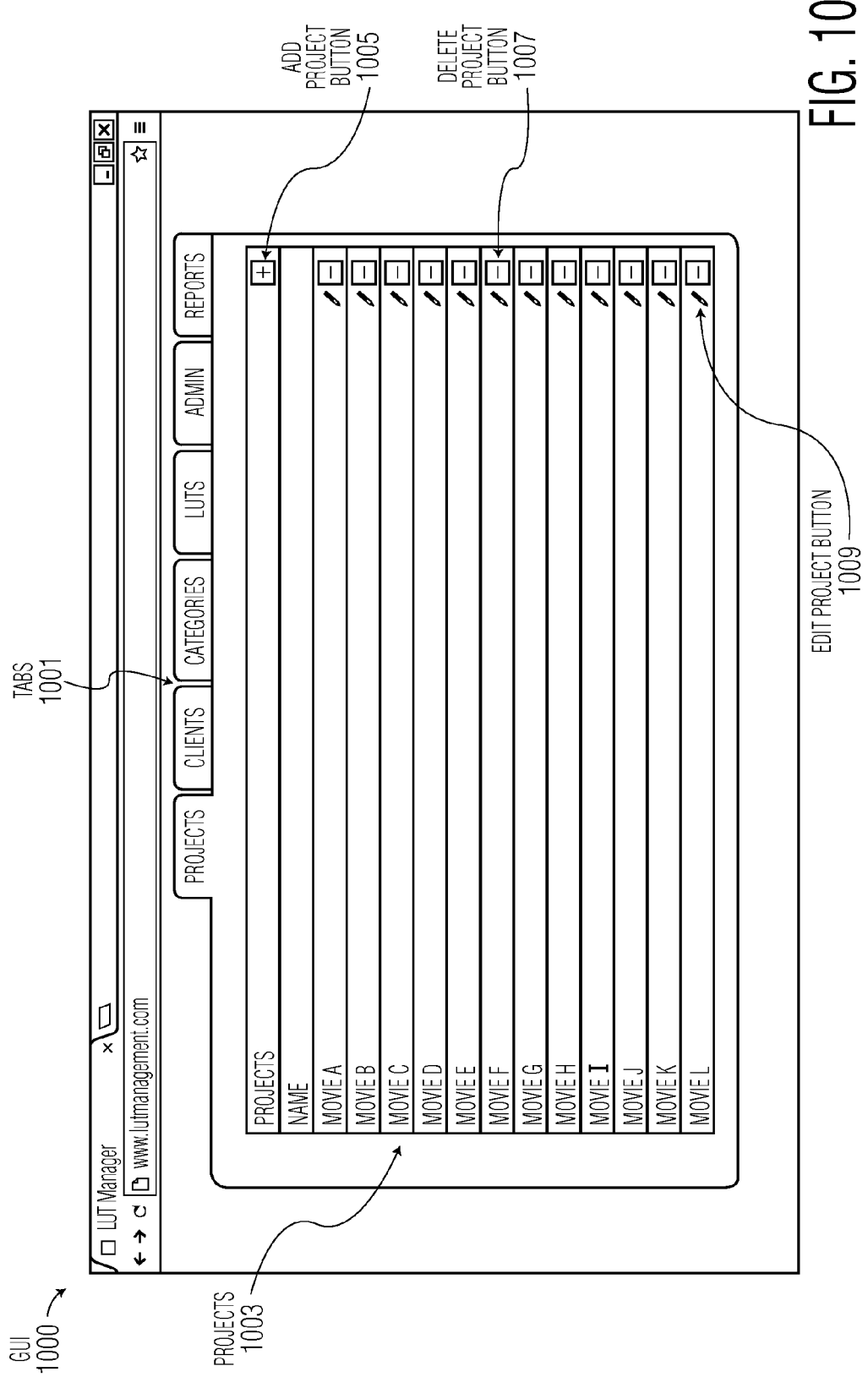
FIG. 10 illustrates an example Projects view of an example GUI for a database administrator according to various embodiments.

FIG. 10 illustrates a GUI 1000 that can include tabs 1001 for navigating to various views including a Projects view, a Clients view, a Categories view, a LUTs view, an Admin view, and a Reports view. FIG. 10 shows an example Projects view of GUI 1000. The Projects view can include a list of projects 1003. An add project button 1005 can be used to add a new project to projects 1003. For each project 1003, GUI 1000 can include a delete project button 1007 and an edit project button 1009.

Figure 11:
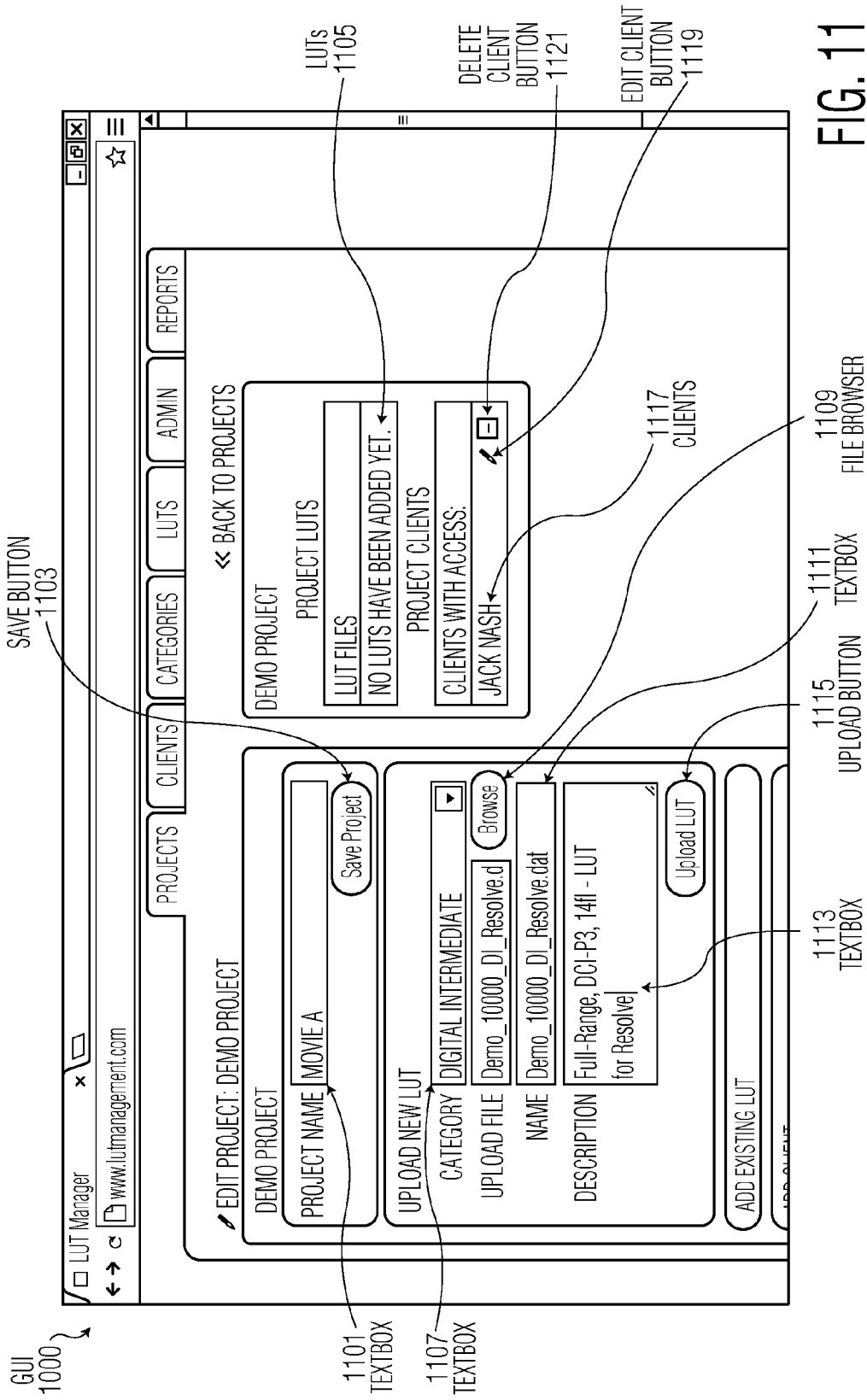
FIG. 11 illustrates an example Edit Project view of the example GUI for a database administrator according to various embodiments.

FIG. 11 illustrates an example Edit Project view of GUI 1000, which can be accessed by activating edit project button 1009 in the Projects view described above. The Edit Project view can include a textbox 1101 to edit the project name and a save button 1103 to save the edited project. The Edit Project view can also include a list of LUTs 1105, which can show the color LUTs that are associated with the project. A new color LUT can be uploaded to the project by selecting a category for the new LUT in textbox 1107, selecting the color LUT file with file browser 1109, inputting a name for the new LUT in textbox 1111, inputting an optional description in textbox 1113, and activating an upload button 1115. In this way, for example, color LUTs can be associated with particular projects and categories, as described above with respect to FIG. 6. Inputting the optional description into textbox 1113 can store the description as a note in the database. Notes provided by the colorist can be helpful for a client to understand, for example, how the color LUT should be applied. It should be noted that the note is accessible by the first user while the first user has access to the first LUT and inaccessible by the first user while the first user does not have access to the first LUT. In some embodiments, an additional note associated with a particular color LUT can be stored in the database, such that the additional note is accessible by the second user and is inaccessible by the first user, regardless of whether the first user has access to the color LUT. For example, an additional text box (not shown) can be used to input the additional note. Additional notes that are accessible by the colorist, but not by the client, can be helpful for the colorist to identify a particular apparently obsolete color LUT that is later desired by the client.

The Edit Project view can also include a list of clients 1117 that are associated with the project. Clients 1117 can be edited by activating edit client button 1119, and the clients can be deleted by activating delete client button 1121. In this way, for example, permissions for client access to color LUTs of particular project can be set, as described above with respect to FIG. 6.

Figure 12:
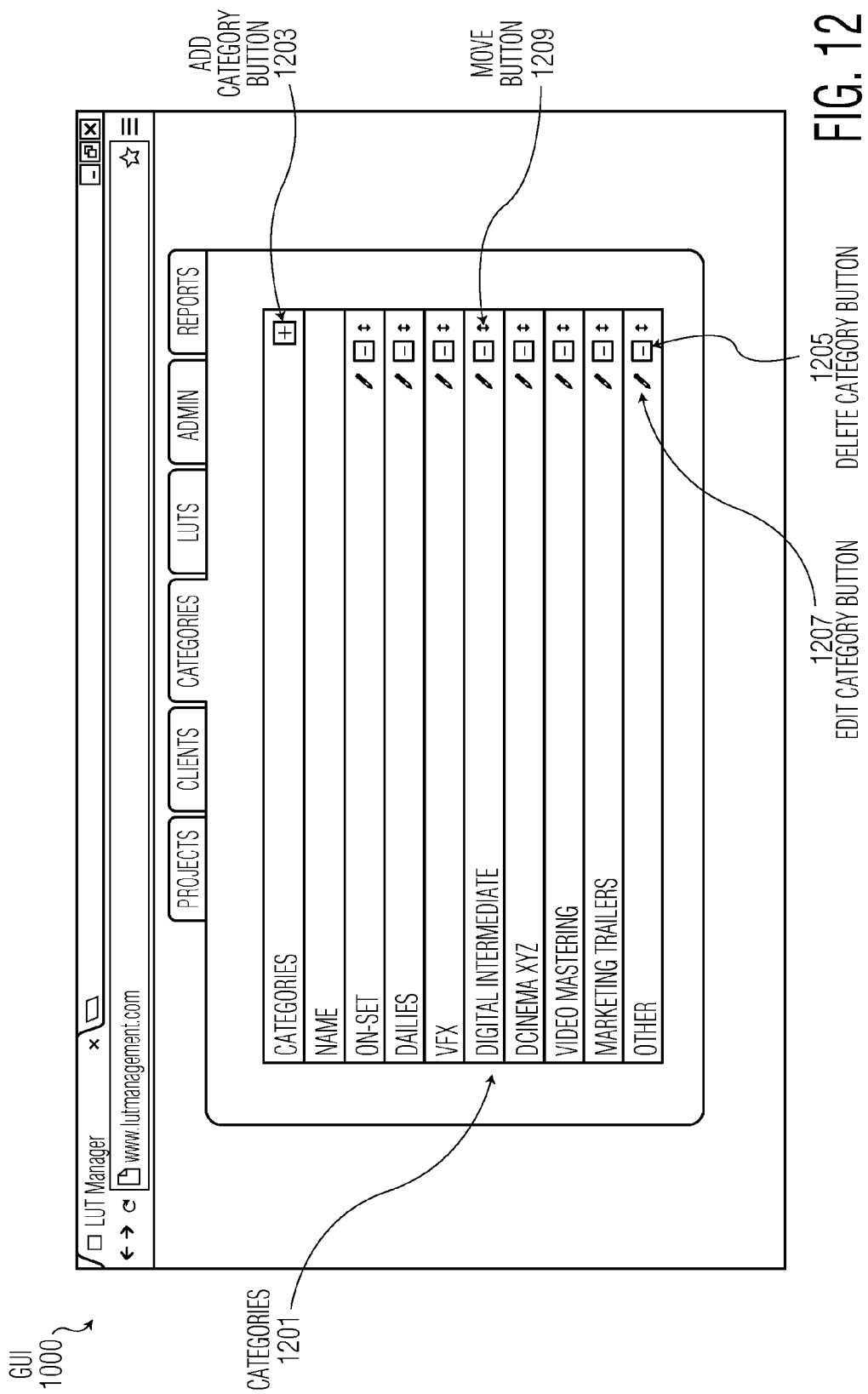
FIG. 12 illustrates an example Categories view of the example GUI for a database administrator according to various embodiments.

FIG. 12 illustrates an example Categories view of GUI 1000, which can include a list of categories 1201. A category can be added to categories 1201 by activating an add category button 1203. For each category 1201, GUI 1000 can include a delete category button 1205, an edit category button 1207, and a move category button 1209.

Figure 13:
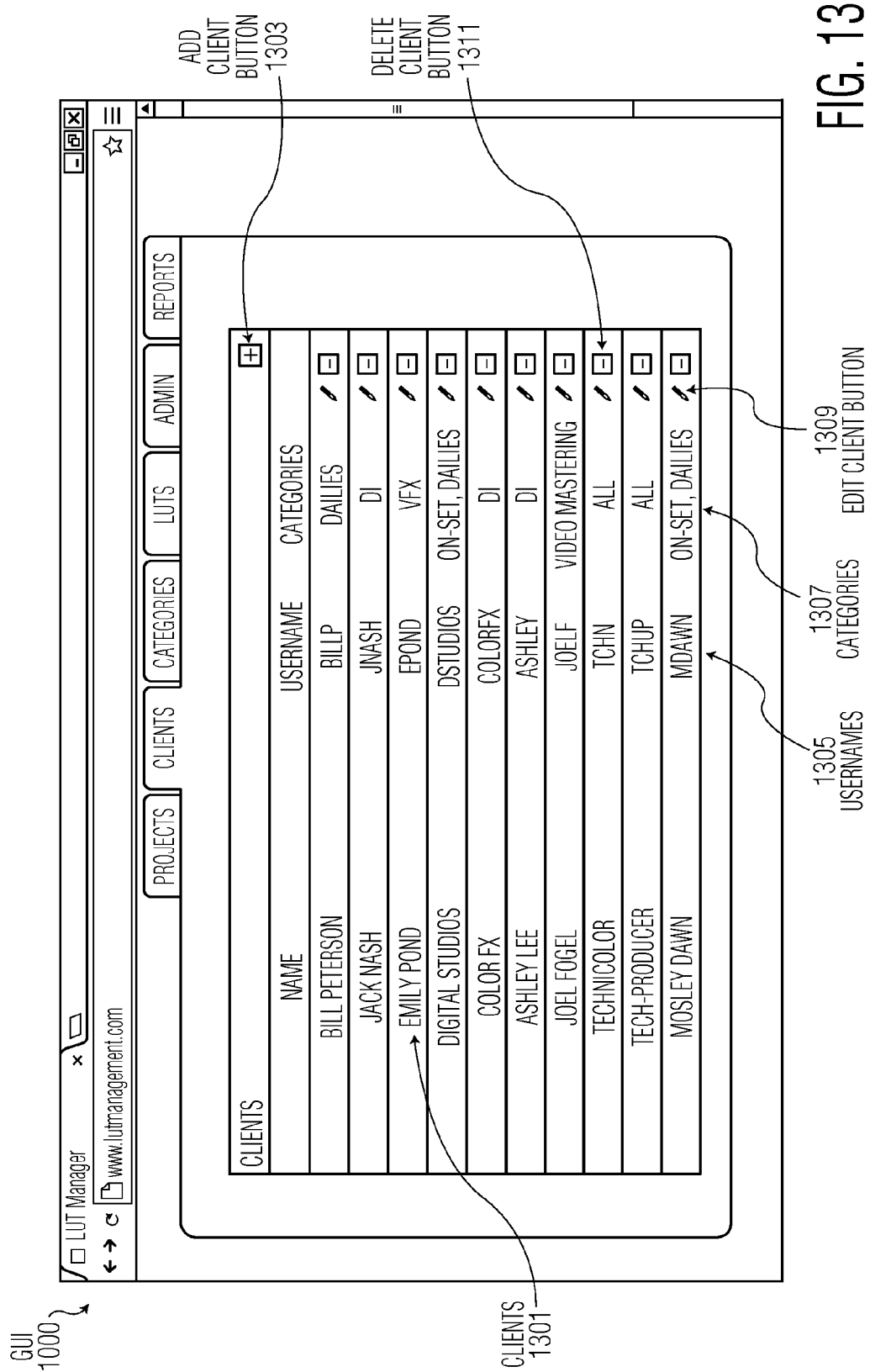
FIG. 13 illustrates an example Clients view of the example GUI for a database administrator according to various embodiments.

FIG. 13 illustrates an example Clients view of GUI 1000, which can include a list of clients 1301. Clients 1301 can include, for example, the first user, the second user, internal entities, external entities, etc. as described above. A client can be added to clients 1301 by activating an add client button 1303. For each client 1301, GUI 1000 can include a username 1305, a list of categories 1307 associated with the client, an edit client button 1309, and a delete client button 1311. Edit client button 1309 can be used, for example, to modify the categories to which a client has access. In this way, for example, permissions for client access to color LUTs of particular categories can be set, as described above with respect to FIG. 6.

Figure 14:
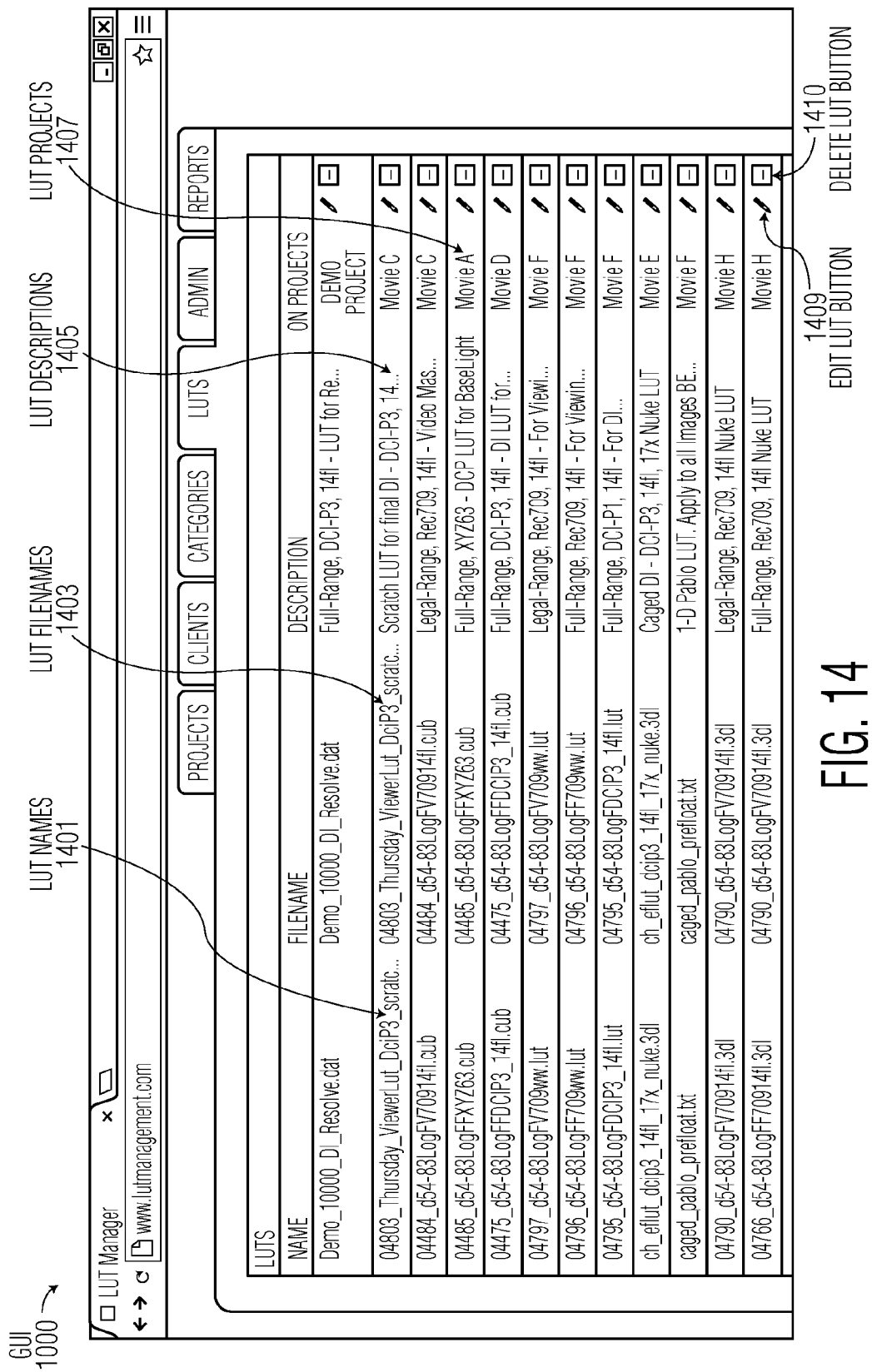
FIG. 14 illustrates an example LUT view of the example GUI for a database administrator according to various embodiments.

FIG. 14 illustrates an example LUT view of GUI 1000, which can include a list of LUT names 1401. For each LUT name 1401, GUI 1000 can include a LUT filename 1403, a LUT description 1405, a list of projects associated with the LUT 1407, an edit LUT button 1409, and a delete LUT button 1411.

Figure 15:
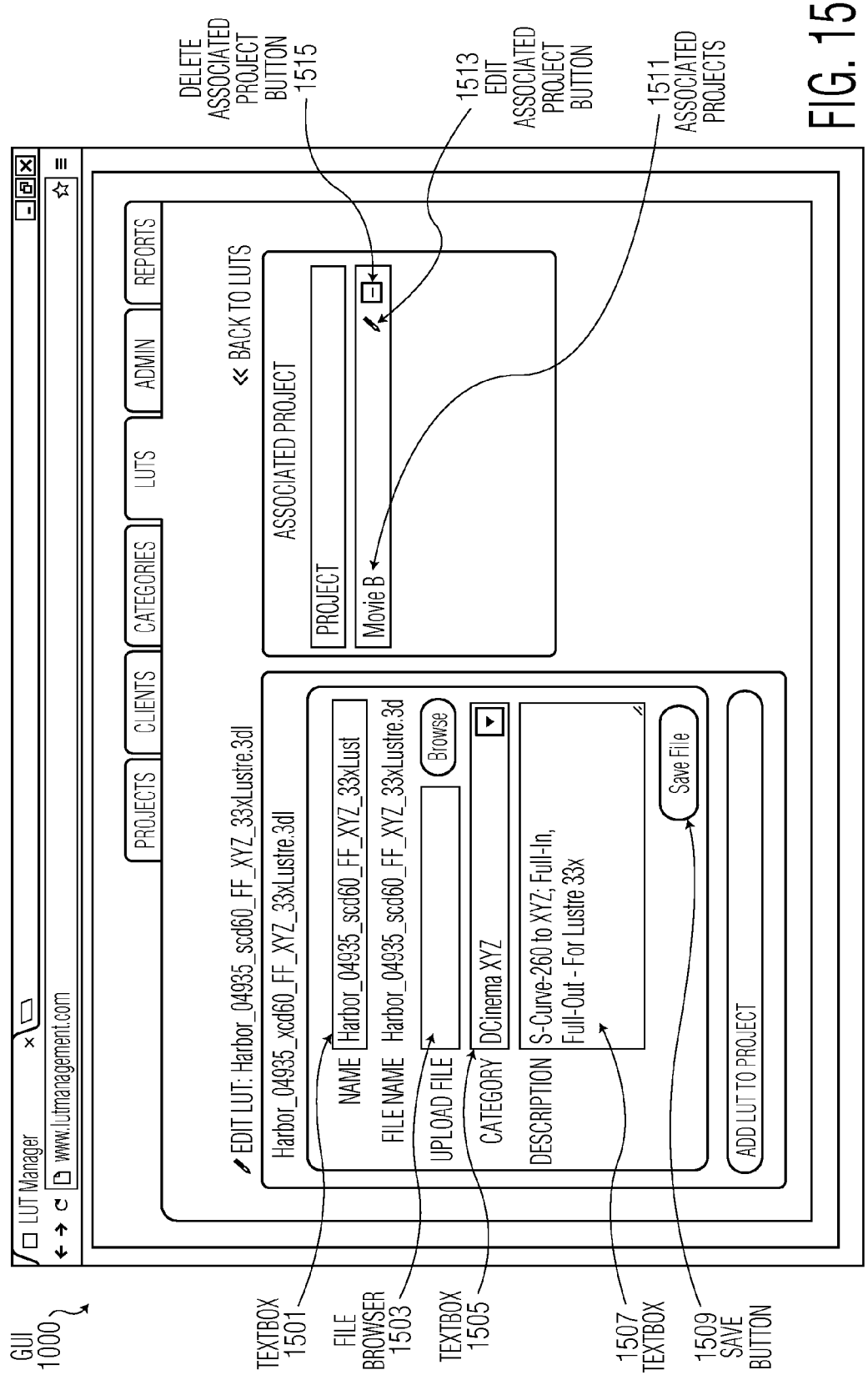
FIG. 15 illustrates an example Edit LUT view of the example GUI for a database administrator according to various embodiments.

FIG. 15 illustrates an example Edit LUT view that can be accessed by activating edit LUT button 1409. The name of the color LUT can be edited in textbox 1501. A file for the color LUT can be uploaded using a file browser 1503. The color LUT can be associated with a category by inputting the category in textbox 1505. An optional description of the color LUT can be input in textbox 1507. Changes to the color LUT can be saved by activating a save button 1509. Projects that are associated with the color LUT can be listed as associated projects 1511. For each associated project, GUI 1000 can include an edit associated project button 1513 and a delete associated project button 1515. In this way, for example, color LUTs can be associated with particular projects, as described above with respect to FIG. 6.

Figure 16:
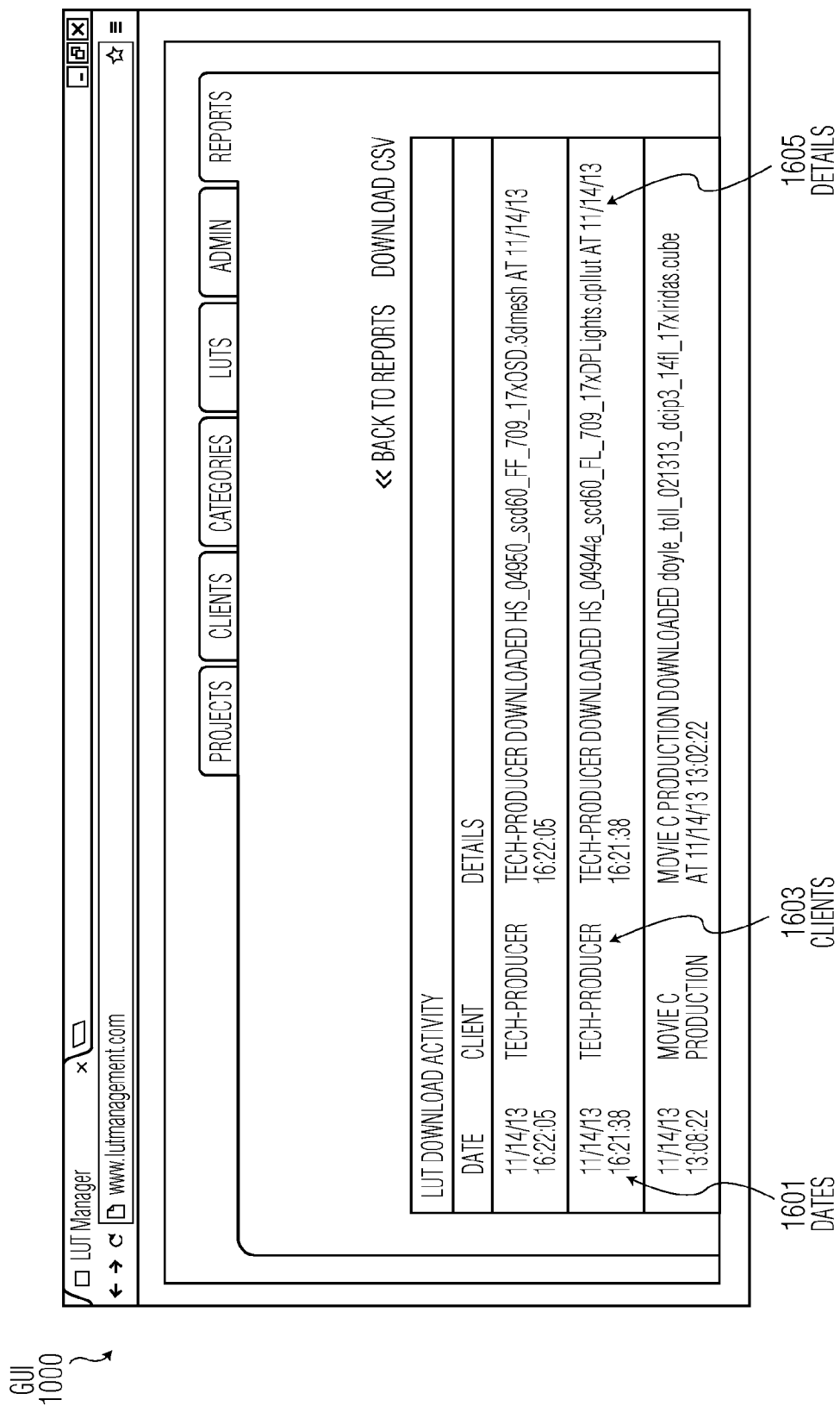
FIG. 16 illustrates an example Reports view of the example GUI for a database administrator according to various embodiments.

FIG. 16 illustrates an example Reports view of GUI 1000. The Reports view can be used to track user activity, such as download history. For example, upon selection of the Reports tab in GUI 1000, a report can be generated and displayed. The report can include dates 1601 on which clients 1603 downloaded a color LUT. Details 1605 of each download can be provided. In some embodiments, other information can be tracked, such as an Internet protocol (IP) address and/or a location of the device to which a color LUT is downloaded. Referring to database 500 described above in reference to FIG. 5, information in the Reports view may be helpful in determining whether an apparently obsolete color LUT should be assigned as a second-tier LUT or a third-tier LUT.

As mentioned above, some embodiments may include more than one level of administrative privileges, such as "super administrator" privileges and "administrator" privileges. In some of these embodiments, a super administrator may view all of tabs 1001, while administrators may view only the tabs for Projects view, Clients view, Categories view, and LUTs view. In this way, for example, projects, clients, categories, and LUTs can be added, removed, and edited by both super administrators and administrators. However, only super administrators can add and remove administrators, promote an administrator to a super administrator, and access the reports.

Although the disclosed embodiments have been fully described with reference to the accompanying drawings, it is to be noted that various changes and modifications should become apparent to those skilled in the art after reviewing the present disclosure. Such changes and modifications are to be understood as being included within the scope of the disclosed embodiments as defined by the appended claims.

What is claimed is:

1. A method performed by a processor connected to a storage device and comprising:
    storing, in the storage device by the server, a first LUT in a database;
    storing, in the storage device by the server, a second LUT in the database;
    generating, by the server, a graphical user interface (GUI) granting a first user access to the first LUT, wherein the first user has access to the first LUT for a first period of time;
    generating, by the server, the graphical user interface (GUI) granting the first user access to the second LUT;
    modifying, by the server, the graphical user interface (GUI) granting a second user access to both the first and second LUTs, wherein the second user has access to the first LUT for a second period of time;
    modifying, by the server, the graphical user interface (GUI) removing the first user's access to the first LUT while the second user's access to the first LUT is maintained; and
    modifying, by the server, the graphical user interface (GUI) granting the first user a second access to the first LUT, wherein the first user has second access to the first LUT for a third period of time, the third period of time beginning after the end of the first period of time, wherein the second period of time overlaps with the first and third periods of time.

2. The method of claim 1, further comprising:
    obtaining, by the server, a value determination of each of the first and second LUTs, wherein removing the first user's access to the first LUT is based on one or both of the value determinations.

3. The method of claim 1, wherein the first user has access to the second LUT for a fourth period of time, and the first and fourth periods of time do not overlap.

4. The method of claim 1, further comprising:
    assigning, by the server, the first user to one of a plurality of categories, wherein granting the first user access to the first and second LUTs is based on the first user's assigned category.

5. The method of claim 1, further comprising:
    storing, in the storage device by the server, a first note in the database, wherein the first note is accessible by the first user while the first user has access to the first LUT and inaccessible by the first user while the first user does not have access to the first LUT; and
    storing, in the storage device by the server, a second note in the database, wherein the second note is accessible by the second user and is inaccessible by the first user.

6. The method of claim 1, further comprising:
    logging, by the server, an access activity of the first user;
    receiving, by the server, a request; and
    generating, by the server, a report of the access activity in response to the request.

7. The method of claim 6, wherein the access activity includes information that the first user downloaded the first LUT from the database.

8. A non-transitory computer-readable storage medium that stores computer-executable instructions executable by a processor to perform a method comprising:
    storing a first LUT in a database;
    storing a second LUT in the database;
    generating a GUI granting a first user access to the first LUT, wherein the first user has access to the first LUT for a first period of time;
    generating the GUI granting the first user access to the second LUT;
    modifying the GUI granting a second user access to both the first and second LUTs, wherein the second user has access to the first LUT for a second period of time;
    modifying the GUI removing the first user's access to the first LUT while the second user's access to the first LUT is maintained; and modifying the GUI granting the first user a second access to the first LUT, wherein the first user has second access to the first LUT for a third period of time, the third period of time beginning after the end of the first period of time, wherein the second period of time overlaps with the first and third periods of time.

9. The non-transitory computer-readable medium of claim 8, the method further comprising:
obtaining a value determination of each of the first and second LUTs, wherein removing the first user's access to the first LUT is based on one or both of the value determinations.

10. The non-transitory computer-readable medium of claim 8, wherein the first user has access to the second LUT for a fourth period of time, and the first and fourth periods of time do not overlap.

11. The non-transitory computer-readable medium of claim 8, the method further comprising:
assigning the first user to one of a plurality of categories, wherein granting the first user access to the first and second LUTs is based on the first user's assigned category.

12. The non-transitory computer-readable medium of claim 8, the method further comprising:
storing a first note in the database, wherein the first note is accessible by the first user while the first user has access to the first LUT and inaccessible by the first user while the first user does not have access to the first LUT; and
storing a second note in the database, wherein the second note is accessible by the second user and is inaccessible by the first user.

13. The non-transitory computer-readable medium of claim 8, the method further comprising:
logging an access activity of the first user;
receiving a request; and
generating a report of the access activity in response to the request.

14. The non-transitory computer-readable medium of claim 13, wherein the access activity includes information that the first user downloaded the first LUT from the database.

15. A computer system comprising:
at least one processor; and
a memory storing instructions executable by the at least one processor to perform a method comprising:
storing, in a storage device, a first LUT in a database;
storing, in the storage device, a second LUT in the database;
generating a GUI granting a first user access to the first LUT, wherein the first user has access to the first LUT for a first period of time;
generating the GUI granting the first user access to the second LUT;
modifying the GUI granting a second user access to both the first and second LUTs, wherein the second user has access to the first LUT for a second period of time;
modifying the GUI removing the first user's access to the first LUT while the second user's access to the first LUT is maintained; and
modifying the GUI granting the first user a second access to the first LUT, wherein the first user has second access to the first LUT for a third period of time, the third period of time beginning after the end of the first period of time, wherein the second period of time overlaps with the first and third periods of time.

16. The computer system of claim 15, the method further comprising:
obtaining a value determination of each of the first and second LUTs, wherein removing the first user's access to the first LUT is based on one or both of the value determinations.

17. The computer system of claim 15, wherein the first user has access to the second LUT for a fourth period of time, and the first and fourth periods of time do not overlap.

18. The computer system of claim 15, the method further comprising:
assigning the first user to one of a plurality of categories, wherein granting the first user access to the first and second LUTs is based on the first user's assigned category.

19. The computer system of claim 15, the method further comprising:
storing a first note in the database, wherein the first note is accessible by the first user while the first user has access to the first LUT and inaccessible by the first user while the first user does not have access to the first LUT; and
storing a second note in the database, wherein the second note is accessible by the second user and is inaccessible by the first user.

20. The computer system of claim 15, the method further comprising:
logging an access activity of the first user;
receiving a request; and
generating a report of the access activity in response to the request.

21. The computer system of claim 20, wherein the access activity includes information that the first user downloaded the first LUT from the database.

* * * * *